United States Patent
Nguyen et al.

(10) Patent No.: US 10,205,945 B2
(45) Date of Patent: Feb. 12, 2019

(54) MULTI-LEVEL SIGNIFICANCE MAPS FOR ENCODING AND DECODING

(71) Applicant: VELOS MEDIA, LLC, Plano, TX (US)

(72) Inventors: Nguyen Nguyen, Seattle, WA (US); Tianying Ji, Albany, CA (US); Dake He, Waterloo (CA)

(73) Assignee: Velos Media, LLC, Plano, TX (US)

( * ) Notice: Subject to any disclaimer, the term of this patent is extended or adjusted under 35 U.S.C. 154(b) by 0 days.

(21) Appl. No.: 15/884,535

(22) Filed: Jan. 31, 2018

(65) Prior Publication Data

US 2018/0152704 A1 May 31, 2018

Related U.S. Application Data

(63) Continuation of application No. 14/621,552, filed on Feb. 13, 2015, now Pat. No. 9,900,597, which is a
(Continued)

(51) Int. Cl.
*H04N 19/122* (2014.01)
*H04N 19/132* (2014.01)
(Continued)

(52) U.S. Cl.
CPC ......... *H04N 19/122* (2014.11); *H04N 19/132* (2014.11); *H04N 19/136* (2014.11);
(Continued)

(58) Field of Classification Search
CPC .. H04N 19/122; H04N 19/132; H04N 19/136; H04N 19/157; H04N 19/18;
(Continued)

(56) References Cited

U.S. PATENT DOCUMENTS

2007/0041450 A1 2/2007 Kim
2007/0071331 A1 3/2007 Liu
(Continued)

FOREIGN PATENT DOCUMENTS

EP 2154894 2/2010
JP 02239776 9/1990
(Continued)

OTHER PUBLICATIONS

Intellectual Property India, Examination Report relating to application No. 4376/CHE/2012, dated Jan. 17, 2018.
(Continued)

*Primary Examiner* — Christopher S Kelley
*Assistant Examiner* — Matthew K Kwan
(74) *Attorney, Agent, or Firm* — Rowand LLP

(57) ABSTRACT

Methods of encoding and decoding for video data are described in which multi-level significance maps are used in the encoding and decoding processes. The significant-coefficient flags that form the significance map are grouped into contiguous groups, and a significant-coefficient-group flag signifies for each group whether that group contains no non-zero significant-coefficient flags. If there are no non-zero significant-coefficient flags in the group, then the significant-coefficient-group flag is set to zero. The set of significant-coefficient-group flags is encoded in the bitstream. Any significant-coefficient flags that fall within a group that has a significant-coefficient-group flag that is non-zero are encoded in the bitstream, whereas significant-coefficient flags that fall within a group that has a significant-coefficient-group flag that is zero are not encoded in the bitstream.

20 Claims, 13 Drawing Sheets

Related U.S. Application Data continuation of application No. 13/286,336, filed on Nov. 1, 2011, now Pat. No. 8,964,849.

(51) Int. Cl.

| | | |
|---|---|---|
| *H04N 19/136* | (2014.01) | |
| *H04N 19/61* | (2014.01) | |
| *H04N 19/196* | (2014.01) | |
| *H04N 19/18* | (2014.01) | |
| *H04N 19/91* | (2014.01) | |
| *H04N 19/70* | (2014.01) | |
| *H04N 19/157* | (2014.01) | |
| *H04N 19/159* | (2014.01) | |
| *H04N 19/13* | (2014.01) | |
| *H04N 19/172* | (2014.01) | |

(52) U.S. Cl.
CPC ........... *H04N 19/157* (2014.11); *H04N 19/18* (2014.11); *H04N 19/196* (2014.11); *H04N 19/61* (2014.11); *H04N 19/70* (2014.11); *H04N 19/91* (2014.11); *H04N 19/13* (2014.11); *H04N 19/159* (2014.11); *H04N 19/172* (2014.11)

(58) Field of Classification Search
CPC ...... H04N 19/196; H04N 19/61; H04N 19/70; H04N 19/91; H04N 19/13; H04N 19/159; H04N 19/172
USPC .................................................. 375/240.18
See application file for complete search history.

(56) References Cited

U.S. PATENT DOCUMENTS

| | | | |
|---|---|---|---|
| 2007/0110153 A1 | 5/2007 | Cho et al. | |
| 2008/0219578 A1 | 9/2008 | Lee | |
| 2009/0175332 A1* | 7/2009 | Karczewicz | H04N 19/176 375/240.03 |
| 2010/0189180 A1 | 7/2010 | Narroschke | |
| 2011/0096834 A1 | 4/2011 | Cheon et al. | |
| 2011/0200110 A1 | 8/2011 | Chen et al. | |
| 2011/0249721 A1 | 10/2011 | Karczewicz et al. | |
| 2012/0082233 A1 | 4/2012 | Sze et al. | |
| 2013/0016771 A1 | 1/2013 | Misra | |
| 2013/0083855 A1* | 4/2013 | Kottke | H04N 19/46 375/240.18 |

FOREIGN PATENT DOCUMENTS

| | | |
|---|---|---|
| JP | 2004064725 | 2/2004 |
| WO | 2008108534 | 9/2008 |
| WO | 2010018138 | 2/2010 |
| WO | WO2011128303 | 10/2011 |

OTHER PUBLICATIONS

EPO, Extended European Search Report relating to Application No. 14200316.9, dated Apr. 16, 2015.

Nguyen et al,: "Multi-Level significance maps for Large Transform Units", Joint Collaborative Team on Video Coding (JCT-VC) of ITU-T SG16 WP3 and ISO/IEC JTC1/SC29/WG11, No. JCTVC-G644, Nov. 9, 2011, XPO55016838.

Marpe D et al.: "Context-based adaptive binary arithmetic coding in the H.264/AVC video compression standard", IEEE Transactions on Circuits and Systems for Video Technology, IEEE Service Center, Piscataway, NJ, US, vol. 13, No. 7, dated Jul. 1, 2003, XP011099255.

Australian Patent Office, AU Office Action relating to Application No. 2012244144, dated Oct. 30, 2013.

KIPO, KR Office Action relating to KR application No. 10-2012-0122364 dated Nov. 1, 2013.

JPO, Japanese Office Action relating to JP application No. 2012-239852 dated Sep. 30, 2013.

EPO, European Office Action relating to Application No. 11187410.3, dated May 2, 2013.

Iain E. Richardson, "The H.264 Advanced Video Compression Standard, 2nd Edition, Chapter 3, Video Coding concepts", Apr. 20, 2010, XP2126854A.

Pennebaker, et al., JPEG Still Image Data Compression Standard, Jan. 1, 1992, XP2126854A.

EPO, Extended European Search Report relating to application No. 11187410.3 dated Jun. 19, 2012.

EPO, Partial Search Report relating to application No. 11187410.3 dated Feb. 15, 2012.

W. J. Han, J-R. Ohm, G. J. Sullivan, and T. Wiegand, "WD4: Working Draft of High-Efficiency Video Coding," JCT-VC of ITU-T SG16 WP3 and ISO/IEC JTC1/SC29/WG11, 6th Meeting, Torino, Jul. 2011.

F. Bossen, "Common Test Conditions and Software References Configurations", JCTVC-F900, JCT-VC of ITU-T SC16 WP3 and ISO/IEC JTC1/SC29/WG11, 6th Meeting, Torino, Jul. 2011.

T. Nguyen, T. Winken, D. Marpe et al., "Reduced-Complexity Entropy Coding of Transform Coefficient Levels Using a combination of VLC and PIPE", May 9, 2014.

Extended European Search Report relating to Application No. 12164134.4, dated Feb. 15, 2013.

USPTO letter dated Aug. 18, 2016.

Blackberry Limited's and Blackberry Corporation's Complaint for Patent Infringement, Demand for Jury Trial, filed Jul. 27, 2016.

SIPO, CN Office Action relating to CN application No. 201610335065.0, dated Jun. 1, 2018.

EPO, EP Office Action relating to EP application No. 14200316.9 dated May 30, 2018.

SIPO, CN Office Action relating to CN application No. 201610335062.0, dated Jun. 1, 2018.

* cited by examiner xC

|    | 0 | 1 | 2 | 3 | 4 | 5 | 6 | 7 | 8 | 9 | 10 | 11 | 12 | 13 | 14 | 15 |
|----|---|---|---|---|---|---|---|---|---|---|----|----|----|----|----|----|
| 0  | 5 | 2 | 0 | 1 | 1 | 0 | 0 | 0 | 1 | 1 | 1  | 0  | 0  | 0  | 0  | 0  |
| 1  | 5 | 0 | 2 | 1 | 2 | 0 | 1 | 1 | 0 | 2 | 1  | 0  | 1  | 0  | 0  | 0  |
| 2  | 0 | 1 | 0 | 0 | 1 | 0 | 1 | 1 | 0 | 1 | 1  | 1  | 0  | 0  | 0  | 0  |
| 3  | 0 | 0 | 0 | 1 | 1 | 1 | 1 | 1 | 0 | 0 | 1  | 0  | 0  | 0  | 0  | 0  |
| 4  | 1 | 1 | 0 | 0 | 1 | 0 | 1 | 0 | 0 | 1 | 0  | 1  | 0  | 0  | 0  | 0  |
| 5  | 2 | 1 | 0 | 1 | 0 | 0 | 1 | 0 | 1 | 0 | 0  | 1  | 0  | 0  | 0  | 0  |
| 6  | 0 | 0 | 1 | 0 | 0 | 0 | 1 | 0 | 1 | 0 | 0  | 0  | 0  | 0  | 0  | 0  |
| 7  | 1 | 0 | 0 | 1 | 1 | 0 | 1 | 0 | 0 | 0 | 0  | 0  | 0  | 0  | 0  | 0  |
| 8  | 0 | 1 | 1 | 1 | 0 | 1 | 0 | 1 | 1 | 1 | 1  | 0  | 0  | 1  | 0  | 0  |
| 9  | 0 | 0 | 1 | 0 | 0 | 1 | 1 | 1 | 0 | 0 | 0  | 1  | 0  | 0  | 0  | 0  |
| 10 | 1 | 0 | 0 | 1 | 0 | 0 | 0 | 0 | 1 | 1 | 0  | 0  | 1  | 0  | 0  | 0  |
| 11 | 0 | 0 | 1 | 0 | 0 | 0 | 0 | 0 | 1 | 1 | 0  | 0  | 0  | 0  | 0  | 0  |
| 12 | 0 | 1 | 0 | 0 | 0 | 1 | 0 | 0 | 0 | 0 | 0  | 0  | 0  | 0  | 0  | 0  |
| 13 | 0 | 0 | 0 | 1 | 0 | 0 | 0 | 0 | 0 | 0 | 0  | 0  | 0  | 0  | 0  | 0  |
| 14 | 0 | 0 | 0 | 0 | 0 | 0 | 0 | 0 | 0 | 0 | 0  | 0  | 0  | 0  | 0  | 0  |
| 15 | 0 | 0 | 0 | 0 | 0 | 0 | 0 | 0 | 0 | 0 | 0  | 0  | 0  | 0  | 0  | 0  | yC

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| 0 | 1 | 1 | 0 | 1 | 1 | 0 | 0 | 0 | 1 | 1 | 1  | 0  | 0  | 0  | 0  | 0  |
| 1 | 1 | 0 | 1 | 1 | 1 | 0 | 1 | 1 | 0 | 1 | 1  | 0  | 1  | 0  | 0  | 0  |
| 2 | 0 | 1 | 0 | 0 | 1 | 0 | 1 | 1 | 0 | 1 | 1  | 1  | 0  | 0  | 0  | 0  |
| 3 | 0 | 0 | 0 | 1 | 1 | 1 | 1 | 1 | 0 | 0 | 1  | 0  | 0  | 0  | 0  | 0  |
| 4 | 1 | 1 | 0 | 0 | 1 | 0 | 1 | 0 | 0 | 1 | 0  | 1  | 0  | 0  | 0  | 0  |
| 5 | 1 | 1 | 0 | 1 | 0 | 0 | 1 | 0 | 1 | 0 | 0  | 1  | 0  | 0  | 0  | 0  |
| 6 | 0 | 0 | 1 | 0 | 0 | 0 | 1 | 0 | 1 | 0 | 0  | 0  | 0  | 0  | 0  | 0  |
| 7 | 1 | 0 | 0 | 1 | 1 | 0 | 1 | 0 | 0 | 0 | 0  | 0  | 0  | 0  | 0  | 0  |
| 8 | 0 | 1 | 1 | 1 | 0 | 1 | 0 | 1 | 1 | 1 | 1  | 0  | 0  | 1  | 0  | 0  |
| 9 | 0 | 0 | 1 | 0 | 0 | 1 | 1 | 1 | 0 | 0 | 0  | 1  | 0  | 0  | 0  | 0  |
| 10| 1 | 0 | 0 | 1 | 0 | 0 | 0 | 0 | 1 | 1 | 0  | 0  | 1  | 0  | 0  | 0  |
| 11| 0 | 0 | 1 | 0 | 0 | 0 | 0 | 0 | 1 | 1 | 0  | 0  | 0  | 0  | 0  | 0  |
| 12| 0 | 1 | 0 | 0 | 0 | 1 | 0 | 0 | 0 | 0 | 0  | 0  | 0  | 0  | 0  | 0  |
| 13| 0 | 0 | 0 | 1 | 0 | 0 | 0 | 0 | 0 | 0 | 0  | 0  | 0  | 0  | 0  | 0  |
| 14| 0 | 0 | 0 | 0 | 0 | 0 | 0 | 0 | 0 | 0 | 0  | 0  | 0  | 0  | 0  | 0  |
| 15| 0 | 0 | 0 | 0 | 0 | 0 | 0 | 0 | 0 | 0 | 0  | 0  | 0  | 0  | 0  | 0  | yC

102 xC

|  | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 1 | 1 | 0 | 1 | 1 | 0 | 0 | 0 | 1 | 1 | 1 | 0 | 0 | 0 | 0 | 0 |
| 1 | 1 | 0 | 1 | 1 | 1 | 0 | 1 | 1 | 0 | 1 | 1 | 0 | 0 | 0 | 0 | 0 |
| 2 | 0 | 1 | 0 | 0 | 1 | 0 | 1 | 1 | 0 | 1 | 1 | 1 | 0 | 0 | 0 | 0 |
| 3 | 0 | 0 | 0 | 1 | 1 | 1 | 1 | 1 | 0 | 0 | 1 | 0 | 0 | 0 | 0 | 0 |
| 4 | 1 | 1 | 0 | 0 | 1 | 0 | 1 | 0 | 0 | 1 | 0 | 1 | 0 | 0 | 0 | 0 |
| 5 | 1 | 1 | 0 | 1 | 0 | 0 | 1 | 0 | 1 | 0 | 0 | 1 | 0 | 0 | 0 | 0 |
| 6 | 0 | 0 | 1 | 0 | 0 | 0 | 1 | 0 | 1 | 0 | 0 | 0 | 0 | 0 | 0 | 0 |
| 7 | 1 | 0 | 0 | 1 | 1 | 0 | 1 | 0 | 0 | 0 | 0 | 0 | 0 | 0 | 0 | 0 |
| 8 | 0 | 1 | 1 | 1 | 0 | 1 | 0 | 1 | 1 | 1 | 1 | 0 | 0 | 1 | 0 | 0 |
| 9 | 0 | 0 | 1 | 0 | 0 | 1 | 1 | 1 | 0 | 0 | 0 | 1 | 0 | 0 | 0 | 0 |
| 10 | 1 | 0 | 0 | 1 | 0 | 0 | 0 | 0 | 1 | 1 | 0 | 0 | 1 | 0 | 0 | 0 |
| 11 | 0 | 0 | 1 | 0 | 0 | 0 | 0 | 0 | 1 | 1 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 | yC (row axis label), 500

FIG. 10

502 xCG

|  | 0 | 1 | 2 | 3 |
|---|---|---|---|---|
| 0 | 0 | 1 | 1 | 0 |
| 1 | 1 | 1 | 1 | 0 |
| 2 | 1 | 1 | 1 | 1 |
| 3 | 0 | 0 | 0 |  | yCG

FIG. 11

MULTI-LEVEL SIGNIFICANCE MAPS FOR ENCODING AND DECODING

COPYRIGHT NOTICE

A portion of the disclosure of this document and accompanying materials contains material to which a claim for copyright is made. The copyright owner has no objection to the facsimile reproduction by anyone of the patent document or the patent disclosure, as it appears in the Patent and Trademark Office files or records, but reserves all other copyright rights whatsoever.

FIELD

The present application generally relates to data compression and, in particular, to methods and devices for encoding and decoding video using multi-level significance maps.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The current state-of-the-art for video encoding is the ITU-T H.264/AVC video coding standard. It defines a number of different profiles for different applications, including the Main profile, Baseline profile and others. A next-generation video encoding standard is currently under development through a joint initiative of MPEG-ITU: High Efficiency Video Coding (HEVC).

There are a number of standards for encoding/decoding images and videos, including H.264, that use block-based coding processes. In these processes, the image or frame is divided into blocks, typically 4x4 or 8x8, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction). It is expected that HEVC (may also be called H.265) will also have these features.

When spectrally transforming residual data, many of these standards prescribe the use of a discrete cosine transform (DCT) or some variant thereon. The resulting DCT coefficients are then quantized using a quantizer to produce quantized transform domain coefficients, or indices.

The block or matrix of quantized transform domain coefficients (sometimes referred to as a "transform unit") is then entropy encoded using a particular context model. In H.264/AVC and in the current development work for HEVC, the quantized transform coefficients are encoded by (a) encoding a last significant coefficient position indicating the location of the last non-zero coefficient in the block, (b) encoding a significance map indicating the positions in the block (other than the last significant coefficient position) that contain non-zero coefficients, (c) encoding the magnitudes of the non-zero coefficients, and (d) encoding the signs of the non-zero coefficients. This encoding of the quantized transform coefficients often occupies 30-80% of the encoded data in the bitstream.

Transform units are typically NxN. Common sizes include 4x4, 8x8, 16x16, and 32x32, although other sizes are possible. The entropy encoding of the symbols in the significance map is based upon a context model. In the case of a 4x4 luma or chroma block or transform unit (TU), a separate context is associated with each coefficient position in the TU. That is, the encoder and decoder track a total of 30 (excluding the bottom right corner positions) separate contexts for 4x4 luma and chroma TUs. The 8x8 TUs are partitioned (conceptually for the purpose of context association) into 2x2 blocks such that one distinct context is associated with each 2x2 block in the 8x8 TU. Accordingly, the encoder and decoder track a total of 16+16=32 contexts for the 8x8 luma and chroma TUs. This means the encoder and decoder keep track of and look up 62 different contexts during the encoding and decoding of the significance map. When 16x16 TUs and 32x32 TUs are taken into account, the total number of distinct contexts involved is 88. Among the additional 26 contexts, 13 are for luma TUs and 13 are for chroma TUs. The assignment of the 13 contexts to the coefficient positions in a 16x16 or 32x32 TU is as follows. Let $(r, c)$ denote a position in the TU, where $0<=r, c<=15$ if the TU is of size 16x16, and $0<=r, c<=31$ if the TU is of size 32x32. Then 3 distinct contexts are assigned to the three positions (0, 0), (0, 1), (1, 0) at the top-left corner including the DC position (0, 0); 5 distinct contexts are assigned to positions in the region $\{(r, c): 2<=r+c<5\}$; and the last 5 distinct contexts are assigned to all the remaining positions. Except for the first 3 contexts for (0, 0), (0, 10), and (1, 0), the derivation of the context for a position in the region $\{(r, c): 2<=r+c<5\}$ depends on its lower-right neighborhood. Let $s(r, c)$ denote the significance flag of a coefficient at position $(r, c)$, i.e., $s(r, c)=1$ if the coefficient is not zero and $s(r, c)=1$ otherwise. The context for position $(r, c)$ is equal to $\min(s(r+1, c)+s(r, c+1)+s(r+2,c)+s(r, c+2)+s(r+1,c+1), 4)$, where $\min(a, b)$ returns the smaller value between a and b. The context of a position $(r, c)$ in the remaining region $\{(r, c): r+c>=5\}$ is similarly derived.

The contexts for 4x4 and 8x8 significance maps are determined by the bit position. The contexts for 16x16 and 32x32 significance maps are mostly determined by the values of the neighboring bits. The determination of context for the 16x16 and 32x32 significance maps is fairly computationally intense, because in most cases the processor determines context by looking at the values of neighboring significant flags, which involves costly memory access operations.

BRIEF DESCRIPTION OF THE DRAWINGS

Reference will now be made, by way of example, to the accompanying drawings which show example embodiments of the present application, and in which:

FIG. 3 shows an example transform unit containing quantized transform domain coefficients;

FIG. 10 shows the example L0 significance map of FIG. 4 after application of L1 RDOQ;

FIG. 11 shows the L1 significance map corresponding to the L0 significance map of FIG. 10, after L1 RDOQ;

Similar reference numerals may have been used in different figures to denote similar components.

DESCRIPTION OF EXAMPLE EMBODIMENTS

Figure 1:
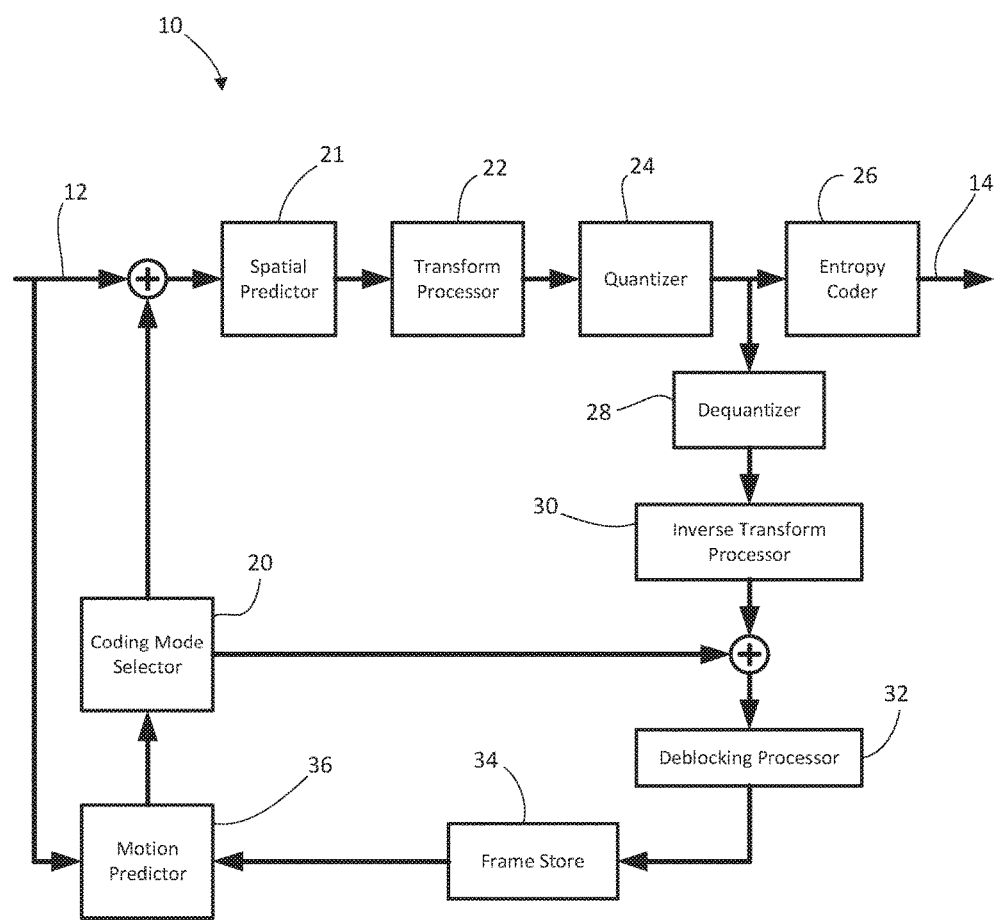
FIG. 1 shows, in block diagram form, an encoder for encoding video.

The present application describes methods and encoders/decoders for encoding and decoding significance maps with context-adaptive encoding or decoding. The encoder and decoder use multi-level significance maps. In at least one case, the multi-level maps are used with larger transform units, such as the 16×16 and 32×32 TUs.

In one aspect, the present application describes a method of reconstructing significant-coefficient flags for a transform unit from a bitstream of encoded data. The method includes reconstructing significant-coefficient-group flags, wherein each significant-coefficient-group flag corresponds to a respective group of significant-coefficient flags; and, reconstructing each significant-coefficient flag by decoding the significant-coefficient flag from the bitstream if that significant-coefficient flag is in a group that has corresponding significant-coefficient-group flag that is non-zero, and setting the significant-coefficient flag to zero, if that significant-coefficient flag is in a group that has corresponding significant-coefficient-group flag that is zero.

In another aspect, the present application describes a method for encoding significant-coefficient flags for a transform unit. The method including encoding significant-coefficient-group flags, wherein each significant-coefficient-group flag corresponds to a respective group of significant-coefficient flags, and wherein the significant-coefficient-group flag is set to zero to indicate that that corresponding group contains no non-zero significant-coefficient flags; and, for each of the significant-coefficient flags, encoding the significant-coefficient flag if that significant-coefficient flag is in one of the groups for which its corresponding significant-coefficient-group flag is non-zero, and not encoding the significant-coefficient flag if that significant-coefficient flag is in one of the groups for which the corresponding significant-coefficient-group flag is zero.

In one aspect, the reconstruction of the significant-coefficient flags is performed in a prescribed order, such as a forward or reverse scan order. In another aspect, the reconstruction of the significant-coefficient-group flags is performed in a prescribed order, which may be the same prescribed order as used with the reconstruction of the significant-coefficient flags, such as forward or reverse scan order.

In one aspect, a significant-coefficient-group flag is set to zero if all significant-coefficient flags in the corresponding group are zero. In another aspect, a significant-coefficient-group flag is non-zero if at least one significant-coefficient flag in the corresponding group is non-zero. In another aspect, a special case may result in a significant-coefficient-group flag being non-zero even if all significant-coefficient flags in the corresponding group are zero, in which case the decoder will decode all the zero value significant-coefficient flags for that corresponding group from the bitstream.

In yet a further aspect, the present application describes a method of reconstructing significant-coefficient flags for a transform unit from a bitstream of encoded data. The method includes decoding significant-coefficient-group flags from the bitstream, wherein each significant-coefficient-group flag corresponds to a respective group of significant-coefficient flags, and wherein each significant-coefficient-group flag is zero if that corresponding group contains no non-zero significant-coefficient flags; and, for each significant-coefficient-group flag, decoding significant-coefficient flags for that corresponding group of significant-coefficient flags from the bitstream if that significant-coefficient-group flag is non-zero, and, otherwise, setting all significant-coefficient flags in that corresponding group of significant-coefficient flags to zero.

In yet another aspect, the present application provides a method for use in an encoder of an image to produce a bitstream of compressed image data, the encoder generating a transform unit from the image, the transform unit including transform coefficients, wherein the transform unit is represented by a significance map containing a significant-coefficient flag for each transform coefficient, and wherein the significance map is partitioned into a plurality of coefficient groups, each coefficient group having an associated significant-coefficient-group flag indicating whether its coefficient group contains at least one non-zero significant-coefficient flag. The method includes, for one of the coefficient groups containing at least one non-zero significant-coefficient flag, determining, using rate-distortion optimized quantization, that said one of the coefficient groups is to be modified to contain all zero significant-coefficient flags; based on that determination, setting all significant-coefficient flags in that coefficient group to zero and setting its significant-coefficient-group flag to zero; and entropy encoding the significant-coefficient-group flags and, for any coefficient groups having an associated significant-coefficient group flag that is non-zero, entropy encoding the significant-coefficient flags for those groups.

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264 standard for video coding and/or the developing HEVC standard. Those ordinarily skilled in the art will understand that the present application is not limited to H.264/AVC or HEVC but may be applicable to other video coding/decoding standards, including possible future standards, multi-view coding standards, scalable video coding standards, and reconfigurable video coding standards.

In the description that follows, when referring to video or images the terms frame, picture, slice, tile and rectangular slice group may be used somewhat interchangeably. Those of skill in the art will appreciate that, in the case of the H.264 standard, a frame may contain one or more slices. It will also be appreciated that certain encoding/decoding operations are performed on a frame-by-frame basis, some are performed on a slice-by-slice basis, some picture-by-picture, some tile-by-tile, and some by rectangular slice group, depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to transform units, coding units, groups of coding units, etc., as will become apparent in light of the description below.

The present application relates to significance maps. A significance map is a block, matrix or group of flags that maps to, or corresponds to, a transform unit. Each flag indicates whether the corresponding position in the transform unit contains a non-zero coefficient or not. In existing standards, these flags may be referred to as significant-coefficient flags. In existing standards, there is one flag per coefficient and the flag is a bit that is zero if the corresponding coefficient is zero and is set to one if the corresponding coefficient is non-zero. The term "significance map" as used herein is intended to refer to a matrix or ordered set of significant-coefficient flags for a transform unit, as will be understood from the description below.

Figure 2:
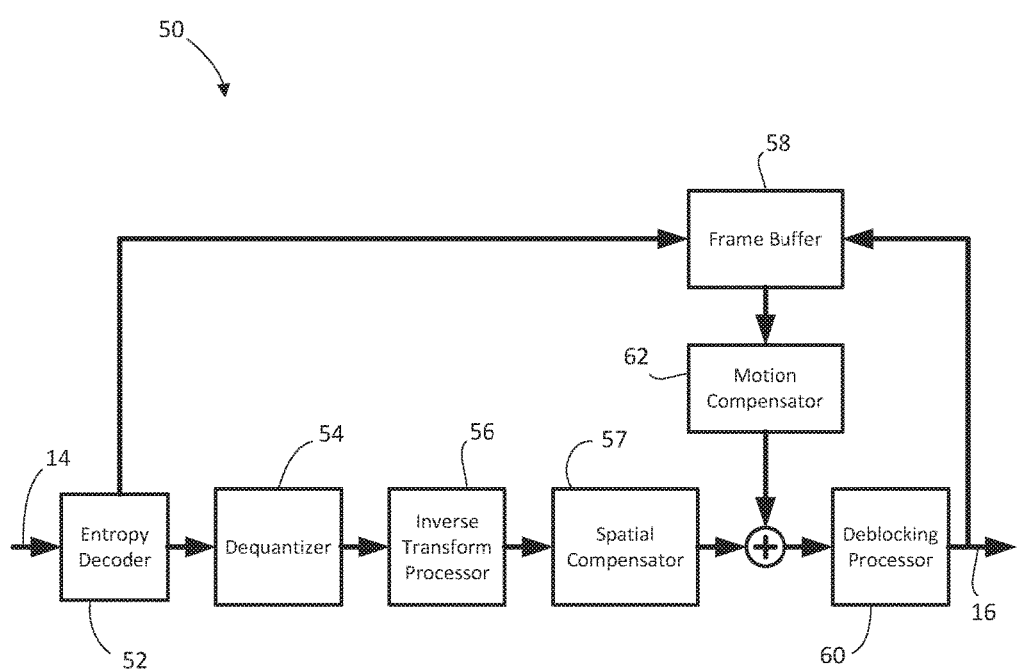
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard, like HEVC.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular coding units (e.g. macroblocks, coding units, etc.) within the frame/slice are inter or intra coded. The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform or others may be used in some instances. The block-based transform is performed on a coding unit, macroblock or sub-block basis, depending on the size of the macroblocks or coding units. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes. In some cases, a 16×16 macroblock may include a non-overlapping combination of 4×4 and 8×8 transform blocks.

Applying the block-based transform to a block of pixel data results in a set of transform domain coefficients. A "set" in this context is an ordered set in which the coefficients have coefficient positions. In some instances the set of transform domain coefficients may be considered as a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

The block or matrix of quantized transform domain coefficients may be referred to herein as a "transform unit".

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then encodes the residual data. H.264, for example, prescribes nine spatial prediction modes for 4×4 transform blocks. In some embodiments, each of the nine modes may be used to independently process a block, and then rate-distortion optimization is used to select the best mode.

The H.264 standard also prescribes the use of motion prediction/compensation to take advantage of temporal prediction. Accordingly, the encoder 10 has a feedback loop that includes a de-quantizer 28, inverse transform processor 30, and deblocking processor 32. The deblocking processor 32 may include a deblocking processor and a filtering processor. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. Accordingly, for macroblocks or coding units to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing video encoders.

The decoder 50 includes an entropy decoder 52, dequantizer 54, inverse transform processor 56, spatial compensator 57, and deblocking processor 60. The deblocking processor 60 may include deblocking and filtering processors. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for use in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data". It will be appreciated that, in some cases, such as with an intra-coded macroblock or coding unit, the recreated "video data" is the residual data for use in spatial compensation relative to a previously decoded block within the frame. The spatial compensator 57 generates the video data from the residual data and pixel data from a previously decoded block. In other cases, such as inter-coded macroblocks or coding units, the recreated "video data" from the inverse transform processor 56 is the residual data for use in motion compensation relative to a reference block from a different frame. Both spatial and motion compensation may be referred to herein as "prediction operations".

The motion compensator 62 locates a reference block within the frame buffer 58 specified for a particular inter-coded macroblock or coding unit. It does so based on the reference frame information and motion vector specified for the inter-coded macroblock or coding unit. It then supplies the reference block pixel data for combination with the residual data to arrive at the reconstructed video data for that coding unit/macroblock.

A deblocking/filtering process may then be applied to a reconstructed frame/slice, as indicated by the deblocking processor 60. After deblocking/filtering, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

It is expected that HEVC-compliant encoders and decoders will have many of these same or similar features.

Significance Map Encoding

As noted above, the entropy coding of a block or set of quantized transform domain coefficients includes encoding the significance map (e.g. a set of significant-coefficient-flags) for that block or set of quantized transform domain coefficients. The significance map is a binary mapping of the block indicating in which positions (other than the last position) non-zero coefficients appear. The block may have certain characteristics with which it is associated. For example, it may be from an intra-coded slice or an inter-coded slice. It may be a luma block or a chroma block. The QP value for the slice may vary from slice to slice. All these factors may have an impact on the best manner in which to entropy encode the significance map.

The significance map is converted to a vector in accordance with the scan order (which may be vertical, horizontal, diagonal, zig zag, or any other scan order prescribed by the applicable coding standard). The scan is typically done in "reverse" order, i.e. starting with the last significant coefficient and working back through the significant map in reverse scan order until the flag at [0,0] is reached. Each significant-coefficient flag is then entropy encoded using the applicable context-adaptive coding scheme. For example, in many applications a context-adaptive binary arithmetic coding (CABAC) scheme may be used. Other implementations may use other context-adaptive codecs with binarization. Examples include binary arithmetic coding (BAC), variable-to-variable (V2V) coding, and variable-to-fixed (V2F) length coding. With 4×4 and 8×8 maps, a context is assigned for each bit position. When encoding the bit (significant-coefficient flag) in that bit position, the assigned context and the context's history to that point determine the estimated probability of a least probable symbol (LPS) (or in some implementations a most probable symbol (MPS)).

In existing video coders, context assignment is predetermined for both the encoder and decoder. For example, with a 4×4 luma block, the current draft HEVC standard prescribes that each bit position in the 4×4 significance map has a unique context. Excluding the last position, that means 15 contexts are tracked for encoding of 4×4 luma significance maps. For each bit position, the context assigned to that position determines the estimated probability associated with an LPS in that position. The actual bit value is then encoded using that estimated probability. Finally, the context assigned to that position is updated based on the actual bit value. At the decoder, the encoded data is decoded using the same context model. A context for each bit position is tracked and used to determine the estimated probability for decoding data to recover bits for that position.

With 16×16 and 32×32 significance maps, the context for a significant is (mostly) based upon neighboring significant-coefficient flag values. Among the 13 contexts used for 16×16 and 32×32 significance maps, there are certain contexts dedicated to the bit position at [0,0] and to neighboring bit positions, but most of the significant-coefficient flags take one of five contexts that depend on the cumulative values of neighboring significant-coefficient flags. In these instances, the determination of the correct context for a significant-coefficient flag depends on determining and summing the values of the significant-coefficient flags at neighboring locations (typically five locations, but it could be more or fewer in some instances). This involves multiple memory accesses, which can be costly in memory bandwidth requirements. Moreover, in many instances the 16×16 and 32×32 significance maps contain a large number of zeros. Accordingly, there is a substantial cost involved in encoding and transmitting large maps that have few coefficient values.

In accordance with one aspect of the present application, the encoder and decoder use multi-level significance maps for certain transform units. In the examples described below, the multi-level significant maps are used for 16×16 and 32×32 sized transform units; however, it will be understood that they may be used for 8×8 or 64×64 or other sized transform units in some embodiments.

The significant-coefficient flags are grouped. Each significant-coefficient flag falls into one of the groups. For simplicity in many embodiments the groups are formed by (conceptually) dividing or partitioning the transform unit structure into blocks. For example, a 16×16 map may be divided into 4×4 blocks each containing sixteen of the coefficient positions. A 32×32 map may be divided into 8×8 blocks each containing sixty-four of the coefficient positions. The significant-coefficient flags are thus grouped on the basis that they fall into these defined blocks in the matrix structure.

FIG. 3 shows an example 16×16 transform unit 100 (the matrix of quantized transform domain coefficients). For indexing purposes, the bit position within the transform unit may be specified by [xC,yC], wherein xC=0, 1, 2, . . . 15 and yC=0, 1, 2, . . . 15. Using (for example) a diagonal scan order, it will be noted that the last-significant coefficient in this example is at [12, 10], as indicated by reference numeral 112.

Figure 4:
FIG. 4 shows an example significance map containing significant-coefficient flags for the transform unit of FIG. 3.

Reference is now also made to FIG. 4, which shows an example significance map 102. The significance map 102 contains the significant-coefficient flags that are generated from the example transform unit are shown in FIG. 4. It will be noted that a significant-coefficient flag appears in every bit position in the scan order from [0,0] up to, but excluding, the last-significant coefficient at [12, 10]. The significant-coefficient flag at each bit position for which there is a non-zero coefficient in the transform unit 100 is set to 1, whereas each significant-coefficient flag at each bit position at which there is a zero coefficient is set to zero.

The significance map 102, i.e. the set of significant-coefficient flags, may be grouped based upon a uniform division of the transform unit structure into contiguous blocks in one embodiment. The size of the transform unit may determine the size of the blocks. In the case of a 16×16 transform unit, the blocks may be 4×4 in some embodiments. The groupings are illustrated in FIG. 4 by the lines demarking the 4×4 blocks. A larger transform unit, such as a 32×32 transform unit may have its significant-coefficient flags grouped into 4×4 blocks, 8×8 blocks, or other size contiguous blocks.

Although the examples given herein use groups defined as contiguous square blocks for simplicity, the present application is not limited to square groups. Groups may be formed as rectangular blocks in some embodiments. In yet other embodiments, other shapes may be used. For example, with a diagonal scan order, it may be advantageous to use groups formed from diagonal slices of the transform unit, in which case some of the groups may be somewhat trapezoidal in shape.

A higher level significance map corresponding to the matrix of groups may then be generated. The higher level significance map is an ordered set of significant-coefficient-group flags. There is one significant-coefficient-group flag for each group containing at least one significant-coefficient flag. The group containing the last-significant coefficient need not be included in the higher level significance map because it will already be known to contain at least one non-zero coefficient, i.e. the last-significant coefficient. The significance map may be referred to as the level 0, or L0, map. The higher level significance map (i.e. containing the significant-coefficient-group flags) may be referred to as the level 1, or L1, map.

Figure 5:
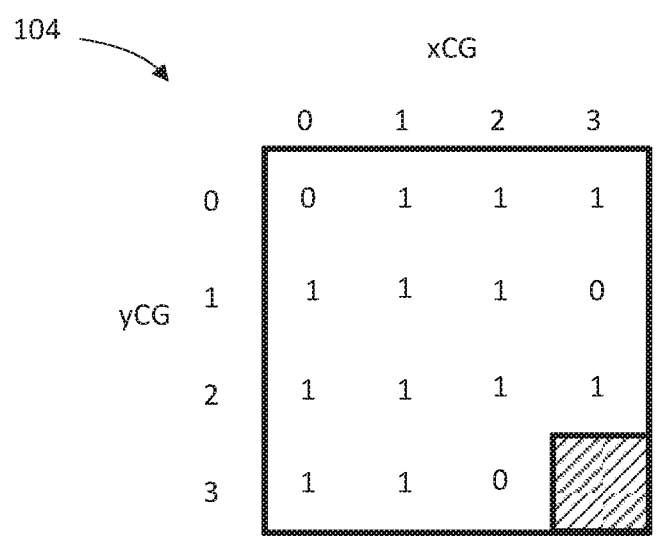
FIG. 5 shows an example L1 significance map containing significant-coefficient-group flags for the significance map of FIG. 4.

FIG. 5 illustrates the L1 higher level significance map 104 corresponding to the example significance map 102 shown in FIG. 4. It will be noted that the L1 map 104 contains a significant-coefficient-group flag for each group that contains at least one significant-coefficient flag. If any of the significant-coefficient flags within the group are non-zero, then the significant-coefficient-group flag is set to one. Otherwise, it is set to zero.

Indexing of the groups may be specified by [xCG, yCG], wherein in this example xCG=0, 1, 2, 3 and yCG=0, 1, 2, 3. The group containing the last-significant coefficient is at [3, 2]. The group at [3,3] does not contain any significant-coefficient flags, so it is not included in the L1 map.

The significant-coefficient-group flags may be converted to vector form in a reverse scan order, in some embodiments. The scan order may be the same as the scan order specified for use with the transform unit generally. In one embodiment, the significant-coefficient-group flag may use a pre-defined scan order than may be different from the selected scan order for the transform unit. In some cases, the L1 map may exclude certain groups like the [0, 0] group or the last-significant-coefficient group, which will have a presumed flag value, as will be described further below.

It will be appreciated, that the L1 map need not be derived directly from the L0 map, but rather could be derived from scanning the coefficients in the transform unit in the scan order.

It will also be appreciated that further higher level maps may be used in some embodiments. For example, if the transform unit is a 64×64 transform unit, the L1 map may be based on dividing the transform unit into 256 4×4 groups. Thus the L1 map would be a 16×16 map containing L1 group flags. A further L2 map may be generated by grouping the L1 flags into a further set of 4×4 blocks (each of which would correspond to a group of 16×16 coefficients from the transform unit). Additional levels of abstraction and/or granularity may be employed in other embodiments.

Figure 6:
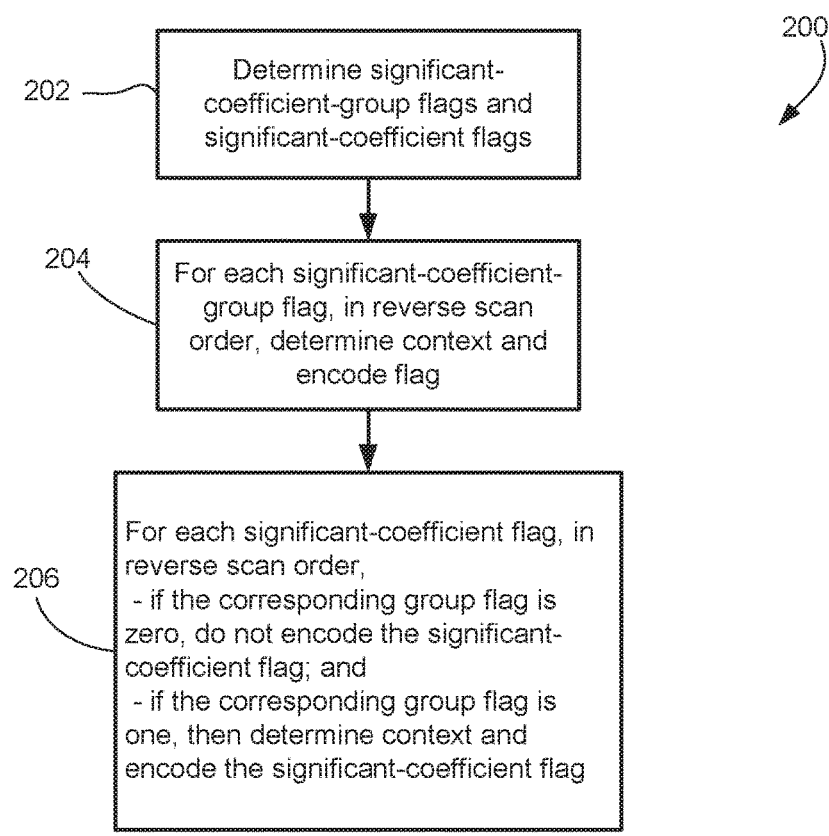
FIG. 6 shows, in flowchart form, an example method of encoding significant-coefficient flags.

Reference is now made to FIG. 6, which shows, in flowchart form, an example process 200 for encoding significant-coefficient flags. The process 200 begins in operation 202 with the encoder determining the significant-coefficient flags and the significant-coefficient-group flags. In one embodiment, the encoder scans the transform block in reverse scan order to determine the last-significant coefficient and the set of significant-coefficient flags. The significant-coefficient-group flags may be determined during the same scan (although a certain amount of buffering of value may be used in practical implementations as the scan order will generally involve crossing through multiple blocks; in some cases, the determination of the significant-coefficient-group flag is made when the encoder determines it has scanned the last coefficient for that group, e.g. the exit coefficient). In some implementations, the encoder may perform a second scan of either the L0 significance map or of the transform unit to determine the significant-coefficient-group flags.

In operation 204, for each significant-coefficient-group flag, the encoder determines the context to use and then entropy encodes that significant-coefficient-group flag based on the determined context. The significant-coefficient-group flags may be processed in a prescribed order. In some embodiments, the prescribed order is the same as the scan order (or reverse scan order) for the transform unit. The number of contexts and their determination may be structured in any suitable manner. An example set of contexts and method for determining contexts for significant-coefficient-group flags is described later below.

Having encoded the set of significant-coefficient-group flags, the encoder then encodes the significant-coefficient flags. In operation 206, the encoder (working in reverse scan order) determines the context of and encodes each significant-coefficient flag if that significant-coefficient flag falls in a group for which the significant-coefficient-group flag is set to 1. If the corresponding significant-coefficient-group flag is set to zero, then any of the significant-coefficient flags in that group are not encoded, i.e. they are skipped during the entropy encoding process.

Accordingly, after the process 200 the encoder has produced a bitstream of encoded data which contains the encoded significant-coefficient-group flags and the encoded significant-coefficient flags that fall into a group that has at least one non-zero significant-coefficient flag. The bitstream does not include any significant-coefficient flags from any group that does not have at least one non-zero significant-coefficient flag.

Figure 7:
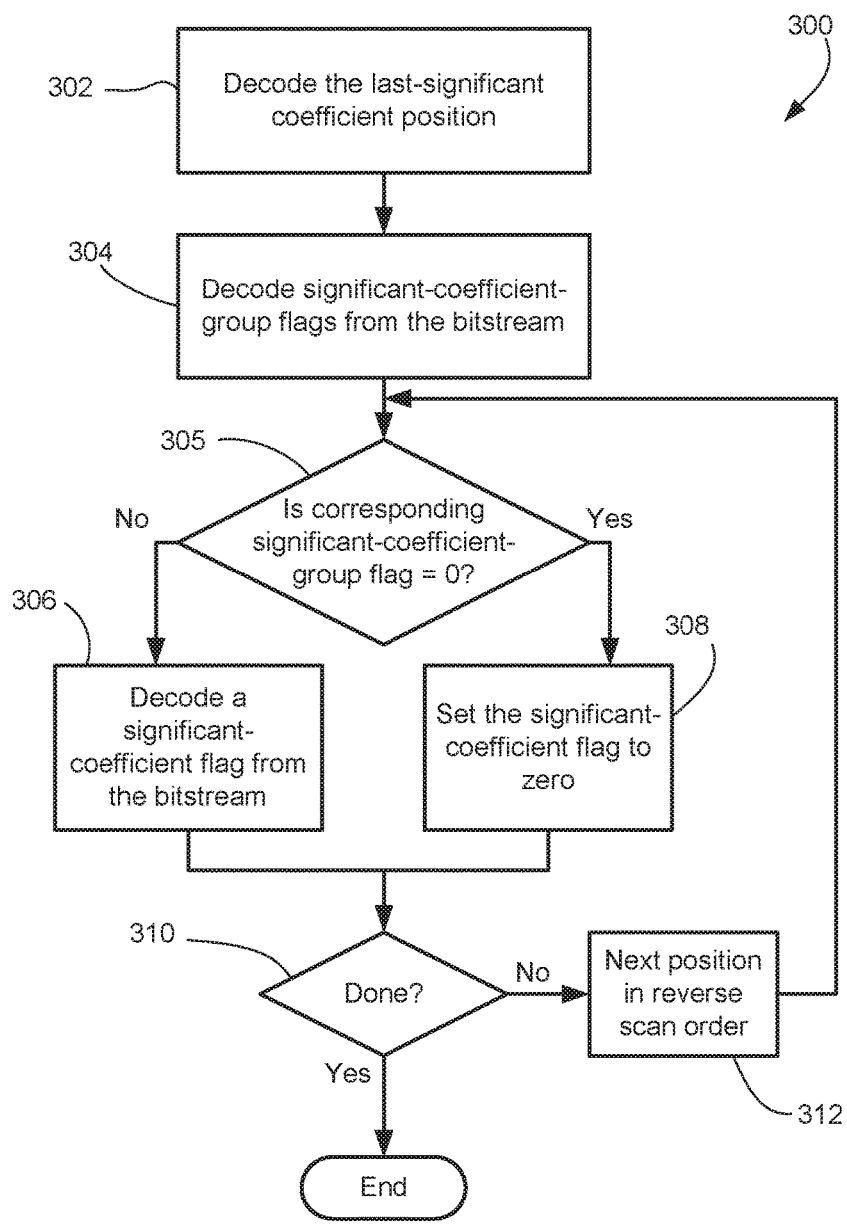
FIG. 7 shows, in flowchart form, an example method for reconstructing a significance map from encoded data.

At the decoder, the significant-coefficient flags need to be reconstructed from the encoded data of the bitstream. Reference is now made to FIG. 7, which shows, in flowchart form, an example process 300 for reconstructing significant-coefficient flags from a bitstream of encoded data. The bitstream may be received through a network connection, i.e. streamed, or read from a computer-readable medium, such as a memory (e.g. flash memory, etc.) or a storage disk (e.g. DVD, BluRay™, CD-ROM, etc.). The process 302 is applied in the process of reconstructing a transform unit at a decoder. Not shown is the decoding of header information, both for the sequence and for each slice or picture (depending on the syntax of the video coding standard in use).

In operation 302, the position of the last-significant coefficient is decoded from the bitstream. This information may be represented in any applicable syntax. Some standards provide that the last-significant coefficient is to be specified using matrix notation, e.g. x- and y-based location within the transform unit; some standards provide that the last-significant coefficient is to be signaled using a vector of 0's with a 1 at the last-significant coefficient position, wherein the vector is mapped to the transform unit by the scan order. Any suitable syntax for specifying the last-significant coefficient may be used in operation 302.

In operation 304, the significant-coefficient group flags are decoded from the bitstream. The significant-coefficient group flags may have been entropy encoded using whatever applicable binarization scheme is specified by the standard or specified in the header information. For example, context-adaptive binary arithmetic coding may be used in some instances. The significant-coefficient group flags are decoded by determining the context for each flag position (bit position in the higher level significance map—e.g. the L1 significance map), and then decoding the flag value from the bitstream and updating the context based on the flag value. The size of the set of significant-coefficient-group flags is known because the scan order is known and the last-significant coefficient was identified in operation 302; thus, the size of the L1 significance map is determined. In the case of non-evenly partitioned groups, a suitable signaling of the group sizes and positions may be provided in the syntax.

As noted above, each significant-coefficient-group flag corresponds to a respective one of the contiguous groups defined for the transform unit. One or more of the significant-coefficient flags fall into each of these groups having a significant-coefficient-group flag. Accordingly, each significant-coefficient-group flag corresponds to a respective group of the significant-coefficient flags.

After decoding the set of significant-coefficient-group flags, then the remaining operations for reconstructing the significance map, i.e. the set of significant-coefficient flags, is performed in the prescribed scan order. In the case of a reverse scan order, then the processing begins from the last-significant coefficient (but excluding that last-significant coefficient position, since it is already known to contain a non-zero coefficient). In operation 305, for each significant-coefficient flag the decoder determines whether its corresponding significant-coefficient-group flag is zero. If the corresponding significant-coefficient-group flag is non-zero, then a significant-coefficient flag is decoded from the bitstream as indicated by operation 306. That is, if the associated or corresponding significant-coefficient-group flag indicates that the group may contain at least one non-zero coefficient, then the decoder decodes a significant-coefficient flag from the bitstream for the current position.

If the associated or corresponding significant-coefficient-group flag is a zero, i.e. it indicates that there are no non-zero coefficients in the group, then the decoder sets or reconstructs the current significant-coefficient flag as a zero, as indicated by operation 308. It does not decode it from the bitstream.

At operation 310, the decoder determines whether it has reach the end of the reverse scan order, i.e. the coefficient at the upper left corner of the transform unit, e.g. [0,0]. If so, then the process 300 ends; if not, then the decoder moves to the next position in the reverse scan order in operation 312 and repeats operations 306 and 308 to reconstruct the significant-coefficient flag for that next position.

It will be appreciated that the scan order usually does not result in reconstructing all significant-coefficient flags of a group before moving onto the next group. Rather, the scan order (depending on the scan order and the group geometry) usually scans across group boundaries such that the decoder reconstructs a few flags from one group, a few from an adjacent group, etc., working its way back to the [0,0] position in the reverse scan order.

There may be special cases that are accounted for in the encoding and decoding processes to save bits. For example, as noted above, the group containing the last-significant coefficient will always have a significant-coefficient-group flag that indicates a non-zero coefficient, so that significant-coefficient-group flag does not need to be encoded and transmitted to the decoder. The encoder always encodes the significant-coefficient flags for that group, and the decoder is configured to always decode the significant-coefficient flags for that group.

Another special case that may be included in some embodiments is to always encode and decode the first group. This group contains the DC coefficient at [0, 0] in the transform unit. The probability of this group containing no non-zero coefficients is extremely low. Accordingly, instead of transmitting a significant-coefficient-group flag for the [0, 0] group, the encoder may be configured to always encode the significant-coefficient flags of that group and the decoder may be configured to always decode the significant-coefficient flags of that group.

Yet another special case that may be implemented in some embodiments is also based on probability. It has been noted that when the group to the right and the group below a particular group both contain non-zero coefficients, then the probability that the particular group contains a non-zero coefficient is very high. Therefore, in some embodiments, the encoder and decoder may presume that any group that has a right neighboring group and lower neighboring group that both contain non-zero coefficients, then that group has non-zero coefficient. Thus, with respect to a certain group, if the significant-coefficient-group flag for the group to the right is set to 1, and if the significant-coefficient-group flag for the group below is set to 1, then the encoder does not encode a significant-coefficient-group flag for the certain group and always encoder the significant-coefficient flags for the certain group. The decoder recognizes that the right and lower neighbors have significant-coefficient-group flags indicating non-zero coefficients, so it will automatically assume that the certain group has non-zero coefficients and it will decoder the significant-coefficient flags.

Figure 8:
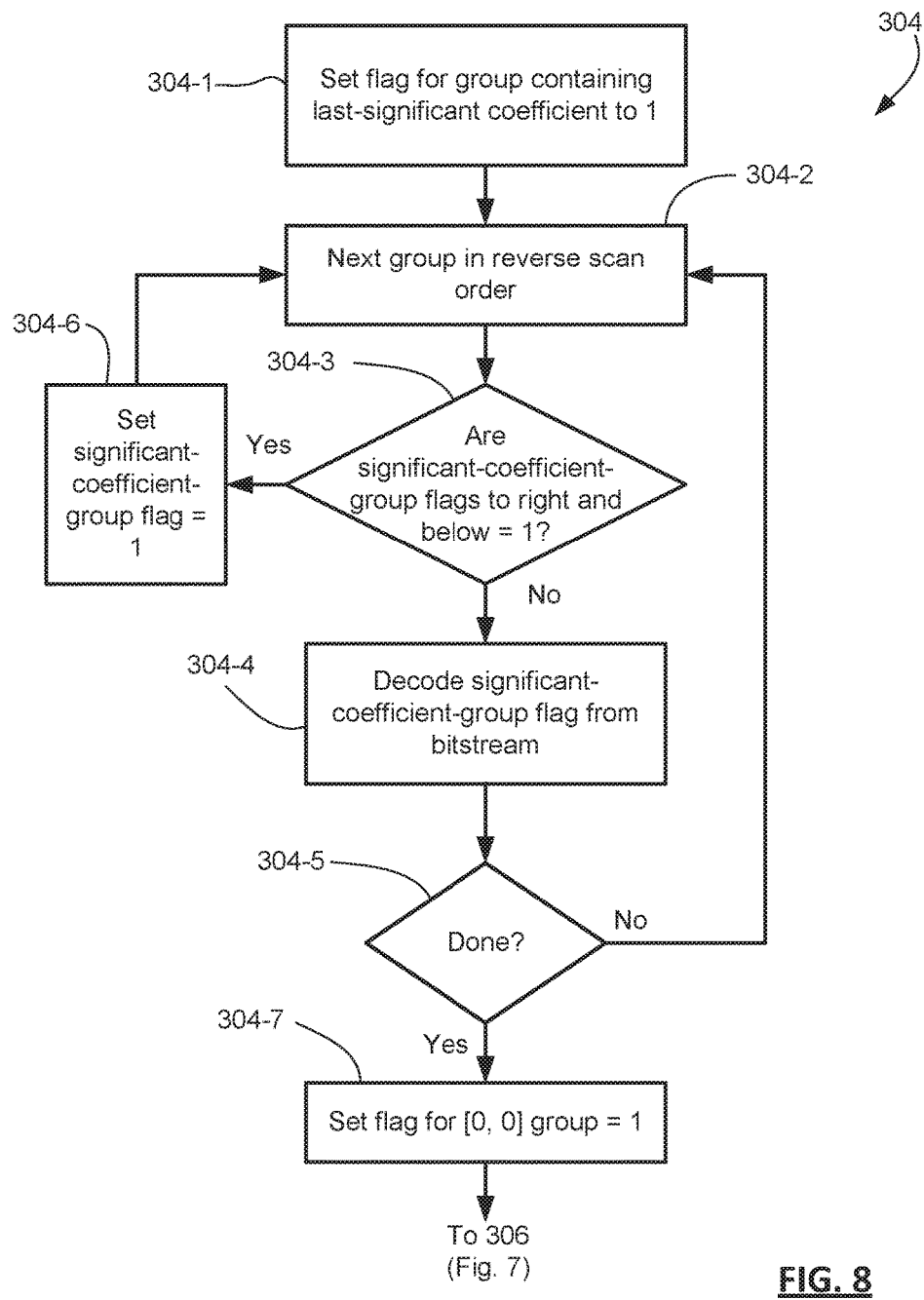
FIG. 8 shows, in flowchart form, an example process for decoding and reconstructing significant-coefficient-group flags.

Reference is now made to FIG. 8, which shows operation 304 from FIG. 7 with additional detail to reflect an example embodiment of the handling of the special cases described above. The operation 304 includes an operation 304-1 in which the significant-coefficient-group flag for the group containing the last-significant coefficient is set to 1. The location of the last-significant coefficient is decoded from the bitstream in an earlier operation (not shown).

The decoder then moves through the groups in reverse scan order. As noted in operation 304-2, the decoder moves from to the next group in the reverse scan order from the group containing the last-significant coefficient. For this group, the decoder assesses whether the significant-coefficient-group flag for the group to the right and the significant-coefficient-group flag for the group below the current group are equal to 1. Initially, the decoder will not have flags to the right and below because it has just started, but later in the scan order (whether horizontal, vertical, or diagonal) the decoder may sometimes have reconstructed significant-coefficient-group flags in these positions relative to the current group (for groups located at the bottom edge of the transform unit, the decoder may not ever have a flag for a group below). If those two adjacent groups are set to 1, then the probability of the current group also being set to 1 is sufficiently high that both the encoder and decoder presume that it is set to one. Accordingly, in operation 304-6, the decoder sets the significant-coefficient-group flag to 1 if the special case condition is met. Otherwise, the decoder moves on to operation 304-4. In another embodiment, this special case may modified to be based on the significant-coefficient-group flags of other adjacent groups, or other groups altogether.

In operation 304-4, the decoder decodes the significant-coefficient-group flag for the current group from the bitstream. The decoding includes determining the context and then decoding in accordance with the determined context. The decoding may be based on binary arithmetic coding (BAC), or other binarized coding/decoding processes.

In operation 304-5, the decoder determines whether this is the next-to-last group in the reverse scan order. If not, then the decoding is not yet finished, so the decoder cycles back to operation 340-2 to advance to the next group in the reverse scan order. If it is the next-to-last group in the reverse scan order, then the decoder moves on to operation 304-7 where the decode sets the significant-coefficient-group flag for the last group, i.e. group [0,0], to 1. This is based on the special case in which that particular group is always presumed by the encoder and decoder to have at least one non-zero coefficient, so the significant-coefficient-group flag is always preset to 1 so that the significant-coefficient flags for that group are always encoded and decoded. After this operation, the decoder goes on to operation 306 or 308 (FIG. 7).

It will be appreciated that the above example process illustrated in FIGS. 7 and 8 the decoding of the L1 significance map (the significant-coefficient-group flags) and the decoding of the L0 significance map (the significant-coefficient flags) as a two-stage process in which the L1 significance map is fully decoded and the L0 significance map is then decoded. In some embodiments this may be the case; however, in some other embodiments, the decoding processes may be partly intertwined. That is, the decoding of the L0 map may begin before the L1 map is fully decoded. It will be appreciated that in some embodiments the decoding of the L0 significance map may begin as soon as the first significant-coefficient-group flag has been reconstructed.

In some embodiment, multi-level significance map coding may be turned on and off depending on, for example, picture type. For instance, multi-level significance map coding may be enabled for I- and P-pictures, but disabled for B-pictures.

Context-Modeling

To improve coding efficiency, the BAC engine (or other entropy coding/decoding engine) uses contexts. The present application proposes using four new contexts for encoding the significant-coefficient-group flags. Two contexts are for luma encoding/decoding and two are for chroma encoding/decoding.

Assume that the reverse scan order is used (other prescribed orders may be used in other implementations). Determining which of the two contexts applies to a given significant-coefficient-group flag may occur as follows. If the significant-coefficient-group flag for the adjacent group to the right of the current group is zero, and the significant-coefficient-group flag for the adjacent group below the current group is zero, then the context for encoding the significant-coefficient-group flag of the current group is 0. Otherwise, the context is 1. If the flags for those two adjacent groups are not available then the unavailable flags are presumed to =0 for the purpose of context determination.

Note that if the forward scan order is used, the context model can be changed to use the significant-coefficient-group flag for the adjacent group to the left of the current group and the significant-coefficient-group flag for the adjacent group above the current group to determine the context.

The context determination process may also include special cases. For example, the upper left group may always be assigned context 1.

There are other possible context models and methods for determining context that may be used. Some examples are given below.

To define notation, let L[i] denote the significance flag of coefficient group i at level L and let N denote the number of the coefficient groups at level L. In general, for a given L and coefficient group i, we use a function c(*) of i and all available L[j] to determine a context $C_i$ for L[i]. The context is thus given by:

$$C\_i = c(i, L[0], L[1], \ldots L[N-1])$$

where j !=i. Note that in order to use L[j] to determine a context for L[i], L[j] itself must be available. Therefore, the selected scan order must guarantee that any L[j] used in c(*) has been determined previously.

In an embodiment similar to the above-described context determination mode, the context may be determined by:

$$C\_i = c(i, L0[0], L0[1], \ldots, L0[15])$$
$$= \text{sum}\{bj * L0[j]\}$$

where j=0, 1, N and j !=i, bj=1 if coefficient group j is the right or lower neighbor of coefficient group i and bj=0 otherwise. This particular embodiment has 3 contexts (6, if a distinct 3 contexts are used for chroma).

Another embodiment of c(*) is given by:

$$C\_i = c(i, L[0], L[1], \ldots, L[N-1])$$
$$= \text{sum}\{bj * L[j]\}$$

where j=0, 1, N and j !=i, bj is non-zero if coefficient group j is any neighboring coefficient group of i that has already been determined and bj=0 otherwise. In this embodiment, the weighting coefficients bj may not necessarily be constants.

Another embodiment of c(*) ignores the significant-coefficient-group flag's of other coefficient groups at L and determines the context based solely on the position i of the current coefficient group. This may be expressed as:

$$C\_i = c(i, L[0], L[1], \ldots, L[N-1])$$
$$= i$$

Other context models and processes for determining context may be used with multi-level significance maps.

Rate-Distortion Optimized Quantization

Some encoding processes employ rate-distortion optimized quantization (RDOQ), or what is sometimes referred to as "soft-quantization". RDOQ is a process of determining optimal quantized transform domain coefficients based on a rate-distortion optimization expression. Accordingly, the quantized transform domain coefficients that result from RDOQ may or may not be the same as the quantized transform domain coefficients that were arrived at through the normal transform and quantization process. In some cases, the coefficient values may have been modified by the RDOQ process because the resulting distortion was determined to have been less costly than the consequent savings in transmission cost.

The RDOQ process normally evaluates four costs in determining the rate component. The four rate costs include the last position rate, the significance rate (L0 rate), the coefficient rate, and the coded block parameter (CBP) rate. To implement multi-level significance maps, it may be advantageous to modify RDOQ to also include the higher-level significance rate (e.g. L1 rate) in the RDOQ calculation.

In one embodiment the RDOQ process may be modified to perform a two-stage RDOQ with regard to significance maps. First, the RDOQ process is applied to determine the best last position and coefficient values and, thus, the L1 significant-coefficient flags. In a second stage, with the last position fixed, the RDOQ process may then be applied again with regard to the L1 rate to determine whether there is a rate-distortion (RD) cost justification for zeroing any coefficients.

Figure 9:
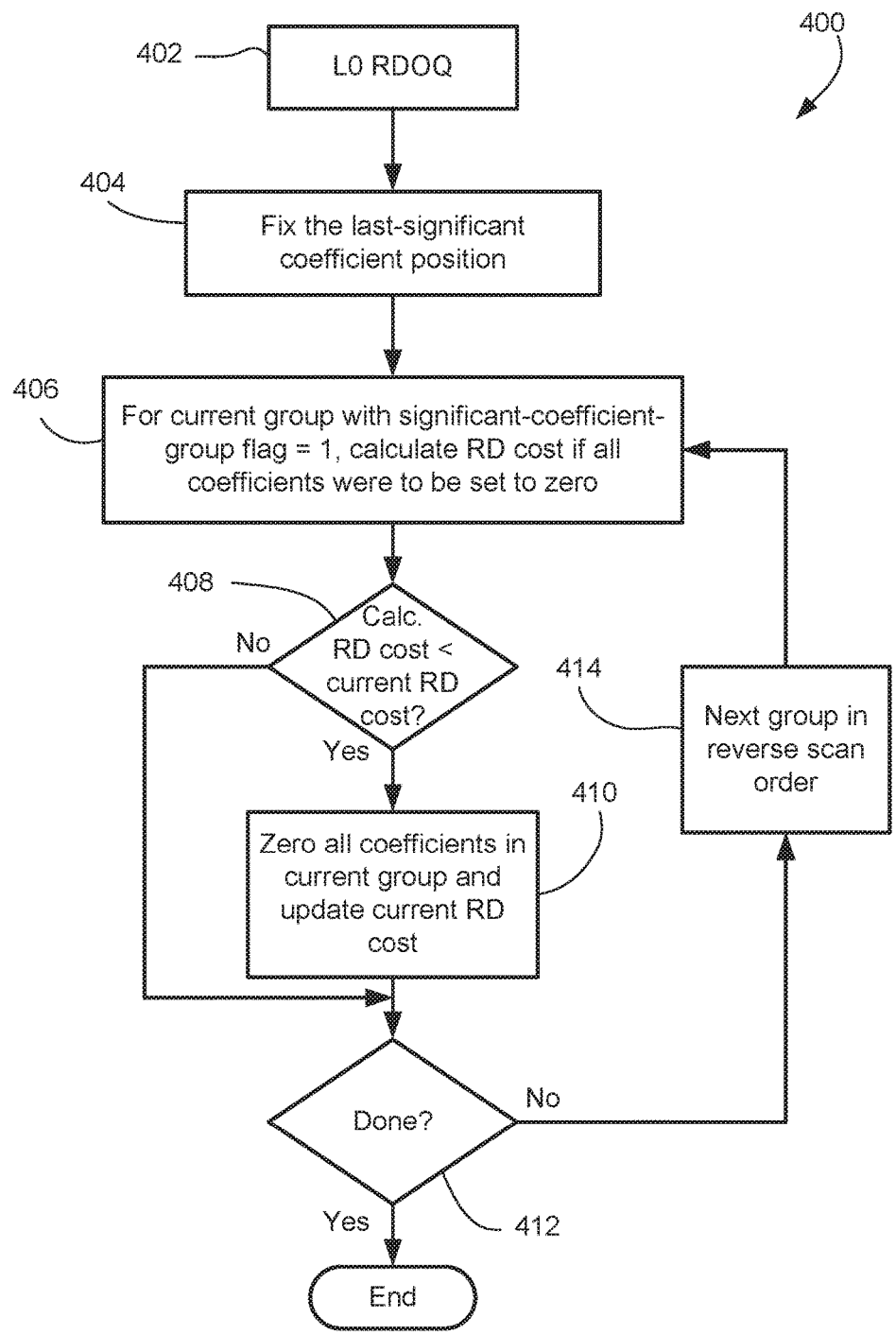
FIG. 9 shows, in flowchart form, an example rate-distortion optimized quantization process for multi-level significance map encoding.

FIG. 9 shows, in flowchart form, an example RDOQ process 400 for encoding of multi-level significance maps. The process 400 uses RDOQ to obtain the optimal quantized transform coefficients and to determine the position of the last significant coefficient, i.e. a L0 RDOQ. The process 400 then fixes the last position and adjusts the current RD cost to account for the effect of the additional levels of significance maps. Then, it uses a greedy approach to further optimize the transform coefficients.

Operation 402 reflects the use of RDOQ to obtain optimal quantized transform domain coefficients, which provides a last-significant coefficient position. Operation 402 results in a certain RD cost based on the rates for transmitting the last position, significance map corresponding to the optimal coefficients, the coefficient values, and CBP.

In operation 404, the last significant position is fixed. That is the last group will contain a non-zero coefficient, i.e. the last significant-coefficient-group flag is fixed at 1. The encoder then greedily determines whether costs savings are found by zeroing coefficients in other groups. The process 400 may be performed in reverse scan order in some embodiments, although it could be processed in another order.

In operation 406, starting with the next-to-last group as the current group, the encoder determines whether the current group has a significant-coefficient-group flag=1. If not, then the group contains only zeros already and the encoder skips to the next group. If the significant-coefficient-group flag=1, then the encoder calculates an RD cost that would result if all coefficients in the current group were zeros. In operation 408, the encoder assesses whether the RD cost newly calculated is better than (e.g. lesser than) the current RD cost. If so, then in operation 410 all coefficients in the current group are zeroed, and the current RD cost is updated to reflect the change. In operation 412, the encoder assesses whether it is done with the L1 RDOQ, e.g. whether it has reached the group just before the [0, 0] group (the [0, 0] group does not get zeroed if the encoder and decoder are configured to presume there is at least one non-zero coefficient in that group, as described in the special cases outlined above). If there are further groups to assess, then the process 400 continues at operation 414, where the encoder moves to the next group (using reverse scan order in some embodiments).

The RDOQ process will now be illustrated by way of an example. References will again be made to the example given above in connection with FIGS. 3, 4 and 5. Prior to L1 RDOQ, but after L0 RDOQ, the optimal quantized transform domain coefficients are shown in FIG. 3. The corresponding L0 significance map is shown in FIG. 4, and the L1 significance map is shown in FIG. 5.

Figure 11:
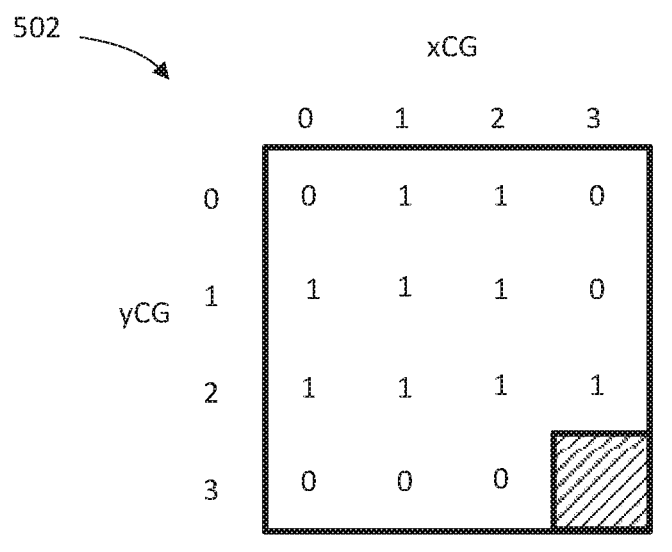

The L1 RDOQ process may result, for example, in an optimized L0 significance map 500 shown in FIG. 10, and the associated or corresponding L1 significance map 502 shown in FIG. 11.

It will be noted that the significant-coefficient flags in the last-significant group, i.e. the [3, 2] group, are unchanged. However, the [3, 0] group, the [0, 3] group, and the [1, 3] group have all been zeroed. As a result, the corresponding significant-coefficient-group flags for these three groups have been changed to zeros as well, as indicated in FIG. 11. The result is that the encoder will not need to encode these three groups. The distortion that results from zeroing the few coefficients that were found in those groups is outweighed by the cost savings in reducing the number of encoded bits, as determined by the RDOQ assessment.

In one possible embodiment, the RDOQ process can be extended to determine the optimal coefficient group size for the current TU. In this embodiment, the process 400 is repeated for multiple rounds, with each round assuming a different coefficient group size and with operation 410 modified so that transform coefficients are not actually set to 0. Essentially, in each round, this modified RDOQ process calculates the RD cost for a particular coefficient group size. After all rounds have completed, the RDOQ selects the coefficient group size that yields the least RD cost and finally, sets any transform coefficients to 0 as required. The encoder encodes the value of the optimal coefficient group size into the bitstream so that it can be obtained and used by the decoder.

The coefficient group sizes that are tested may be based upon the transform unit size. For example, a 32×32 transform unit may test group sizes 8×8, 4×4 and 2×2. The groups to be tested may be selectable, and the encoder may indicate (for example in the sequence header) what group sizes will be tests for each transform unit size. Suppose, for example, that the encoder and decoder have agreed that for 16×16 TUs, the modified RDOQ will test two different coefficient group sizes: 2×2 and 4×4, denoted by 1 and 0, respectively. If the modified RDOQ determines that 2×2 is optimal, the encoder encodes a bin 1 into the bitstream before the significant_coeffgroup_flag's. The decoder decodes this bin before the significant_coeffgroup_flag's and knows that the coefficient group size for the current TU is 2×2.

Example Syntax

An example syntax for implementing multi-level significance maps is provided below. This example syntax is but one possible implementation.

The significant-coefficient-group flags may be denoted and defined as:

significant_coeffgroup_flag[xCG][yGC]

This flag specifies, for the coefficient group position (xCG, yCG) within the current 16×16 or 32×32 transform block, whether the corresponding coefficient group at location (xCG, yCG) has non-zero coefficients as follows:

If significant_coeffgroup_flag[xCG][yCG] is equal to 0, the number of nonzero coefficients in the coefficient group at location (xCG, yCG) is set equal to 0;

Otherwise (significant_coeffgroup_flag[xCG][yCG] is equal to 1), the number of nonzero coefficients in the coefficient group at location (xCG, yCG) is non-zero except for the special cases defined below.

The special cases are defined as follows:
1. The significant_coeffgroup_flag[0][0] at the first coefficient group position (0, 0) in scan order is inferred to be equal to 1.
2. The significant_coeffgroup_flag[xCG][yCG] at the coefficient group position (xCG, yCG) in scan order is inferred to be equal to 1 if significant_coeffgroup_flag [xCG][yCG+1]=1 and significant_coeffgroup_flag [xCG+1][yCG]=1.

When significant_coeffgroup_flag[xCG][yCG] is not present, it is inferred to be equal to 0.

In some embodiments, the significant_coeffgroup_flag [xCG][yCG] does not apply to 4×4 and 8×8 transform blocks.

The following pseudo-code illustrates one example implementation of multi-level significance maps within the decoding process for reconstruction quantized transform domain coefficients (residuals).

It will be noted that the first portion of the pseudo-code includes decoding the last-significant coefficient position. The number of groups are then determined, if the transform unit is 16×16 or larger (as indicated by if (log 2TrafoSize>3)).

| residual_coding_cabac( x0, y0, log2TrafoSize, trafoDepth, scanIdx, cIdx ) { | Descriptor |
|---|---|
| last_significant_coeff_x | ae(v) |
| last_significant_coeff_y | ae(v) |
| numCoeff = 0 | |
| xC = ScanOrder[ log2TrafoSize − 2 ][ log2TrafoSize − 2 ][ scanIdx ][ numCoeff ][ 0 ] | |
| yC = ScanOrder[ log2TrafoSize − 2 ][ log2TrafoSize − 2 ][ scanIdx ][ numCoeff ][ 1 ] | |
| if (log2TrafoSize > 3) { | |
|    log2CoeffGroupSize = log2trafoSize−2 | |
|    numCoeffGroup = 0 | |
|    for (xCG = 0; xCG < 4; xCG++) | |
|       for (yCG = 0; yCG < 4; yCG++) | |
|          numNonZeroSB [ xCG ][ yCG ] = 0 | |
| } | |
| while( ( xC != last_significant_coeff_x ) || ( yC != last_significant_coeff_y ) ) { | |
|    numCoeff++ | |
|    xC = ScanOrder[ log2TrafoSize − 2 ][ log2TrafoSize − 2 ][ scanIdx ][ numCoeff ][ 0 ] | |
|    yC = ScanOrder[ log2TrafoSize − 2 ][ log2TrafoSize − 2 ][ scanIdx ][ numCoeff ][ 1 ] | |
|    if (log2TrafoSize > 3) { | |
|      if ( ( xC % (1<< log2CoeffGroupSize) == 0 ) && ( yC % (1 << log2CoeffGroupSize) == 0 ) ) | |
|         numCoeffGroup++ | |
|    } | |
| } | |
| if (log2TrafoSize > 3) { | |
|    xCGLast = last_significant_coeff_x / (1 << log2CoeffGroupSize) | |
|    yCGLast = last_significant_coeff_y / (1 << log2CoeffGroupSize) | |
|    significant _coeffgroup_flag[ xCGLast ][ yCGLast ] = 1 | |
|    significant_coeffgroup_flag[ 0 ][ 0 ] = 1 | |
|    for( n = numCoeffGroup; n > 0; n-- ) { | |
|      xCG = ScanOrder[ 0 ][ 0 ][ scanIdx ][ n ][ 0] | |
|      yCG = ScanOrder[ 0 ][ 0 ][ scanIdx ][ n ][ 1] | |
|      if (!(xCG == xCGLast && yCG == yCGLast)) | |

| residual_coding_cabac( x0, y0, log2TrafoSize, trafoDepth, scanIdx, cIdx ) { | Descriptor |
|---|---|
|       significant_coeffgroup_flag[ xCG ][ yCG ] | ae(v) |
|     } | |
|   } | |
|   for( n = numCoeff − 1; n >= 0; n− − ) { | |
|     xC = ScanOrder[ log2TrafoSize − 2 ][ log2TrafoSize − 2 ][ scanIdx ][ n ][ 0 ] | |
|     yC = ScanOrder[ log2TrafoSize − 2 ][ log2TrafoSize − 2 ][ scanIdx ][ n ][ 1 ] | |
|     If ( log2TrafoSize > 3 ) { | |
|       xCG = xC >>(log2CoeffGroupSize) | |
|       yCG = yC >>(log2CoeffGroupSize) | |
|       if( significant_coeffgroup_flag[ xCG ][ yCG ] ) { | |
|         if( ( xC % (1<< log2CoeffGroupSize) == 0 ) && ( yC % (1 << log2CoeffGroupSize) == 0 ) && (numNonZeroSB[ xCG ][ yCG ] == 0) && n != 0 ) | |
|           significant_coeff_flag[ xC ][ yC ] = 1 | |
|         else { | |
|           significant_coeff_flag[ xC ][ yC ] | ae(v) |
|           if( significant_coeff_flag[ xC ][ yC]) | |
|             numNonZeroSB[ xCG ][ yCG ]++ | |
|         } | |
|       } | |
|       else { | |
|         significant_coeff_flag[xC][yC] = 0 | |
|       } | |
|     } else | |
|       significant_coeff_flag[ xC ][ yC ] | ae(v) |
|   } | |
|   numLastSubset = numCoeff >> 4 | |
|   for( i = numLastSubset − 1; i >= 0; i− − ) { | |
|     offset = i << 4 | |
|     for( n = 15; n >= 0; n− − ) { | |
|       xC = ScanOrder[ log2TrafoSize − 2 ][ log2TrafoSize − 2 ][ 0 ][ n + offset ][ 0 ] | |
|       yC = ScanOrder[ log2TrafoSize − 2 ][ log2TrafoSize − 2 ][ 0 ][ n + offset ][ 1 ] | |
|       if( significant_coeff_flag[ xC ][ yC ] ) | |
|         coeff_abs_level_greater1_flag[ n ] | ae(v) |
|     } | |
|     for( n = 15; n >= 0; n− − ) { | |
|       if( coeff_abs_level_greater1_flag[ n ] ) | |
|         coeff_abs_level_greater2_flag[ n ] | ae(v) |
|     } | |
|     for( n = 15; n >= 0; n− − ) { | |
|       xC = ScanOrder[ log2TrafoSize − 2 ][ log2TrafoSize − 2 ][ 0 ][ n + offset ][ 0 ] | |
|       yC = ScanOrder[ log2TrafoSize − 2 ][ log2TrafoSize − 2 ][ 0 ][ n + offset' ][ 1 ] | |
|       if( significant_coeff_flag[ xC ][ yC ] ) { | |
|         coeff_sign_flag[ n ] | ae(v) |
|     } | |
|     for( n = 15; n >= 0; n− − ) { | |
|       if( coeff_abs_level_greater2_flag[ n ] ) | |
|         coeff_abs_level_minus3[ n ] | ae(v) |
|       xC = ScanOrder[ log2TrafoSize − 2 ][ log2TrafoSize − 2 ][ 0 ][ n + offset ][ 0 ] | |
|       yC = ScanOrder[ log2TrafoSize − 2 ][ log2TrafoSize − 2 ][ 0 ][ n + offset' ][ 1 ] | |
|       if( significant_coeff_flag[ xC ][ yC ] ) { | |
|         transCoeffLevel[ x0 ][ y0 ][ trafoDepth ][ cIdx ][ n + offset ] = | |
|           ( coeff_abs_level_minus3[ n ] + 3 ) * ( 1 − 2 * coeff_sign_flag[ n ] ) | |
|       } else | |
|         transCoeffLevel[ x0 ][ y0 ][ trafoDepth ][ cIdx ][ n + offset ] = 0 | |
|     } | |
|   } | |
| } | |

The foregoing pseudo-code shows one example implementation of the example process 300 described above in connection with FIG. 7.

Figure 12:
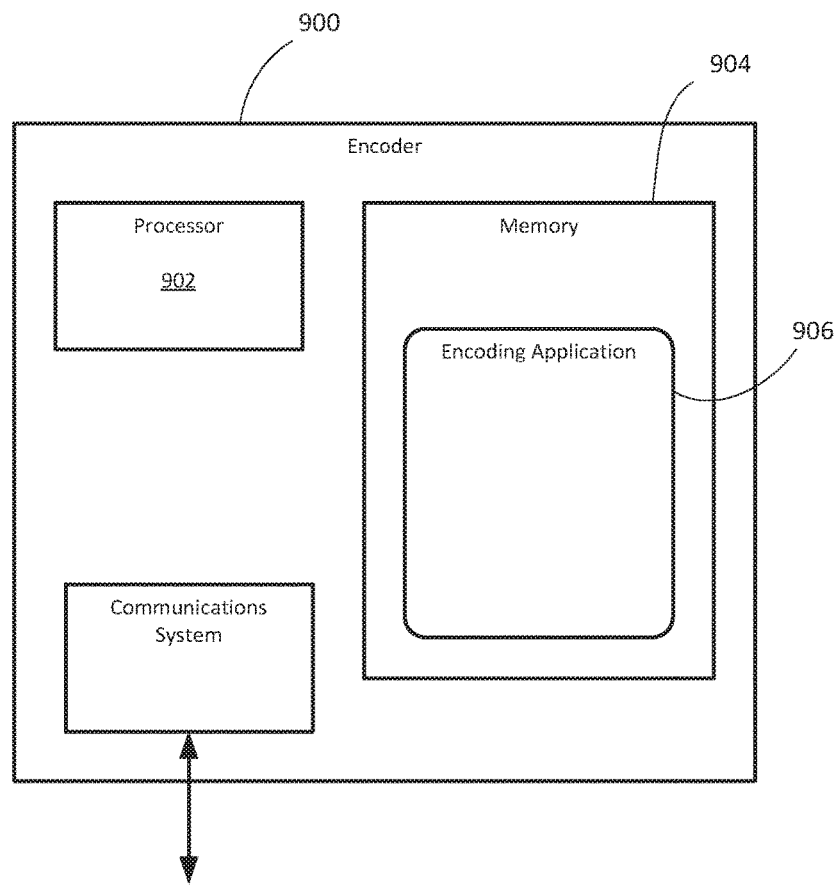
FIG. 12 shows a simplified block diagram of an example embodiment of an encoder.

Reference is now made to FIG. 12, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform operations such as those described herein. For example, the encoding application 906 may encode and output bitstreams encoded in accordance with the multi-level significance map processes described herein. It will be understood that the encoding application 906 may be stored in on a computer readable medium, such as a compact disc, flash memory device, random access memory, hard drive, etc.

Figure 13:
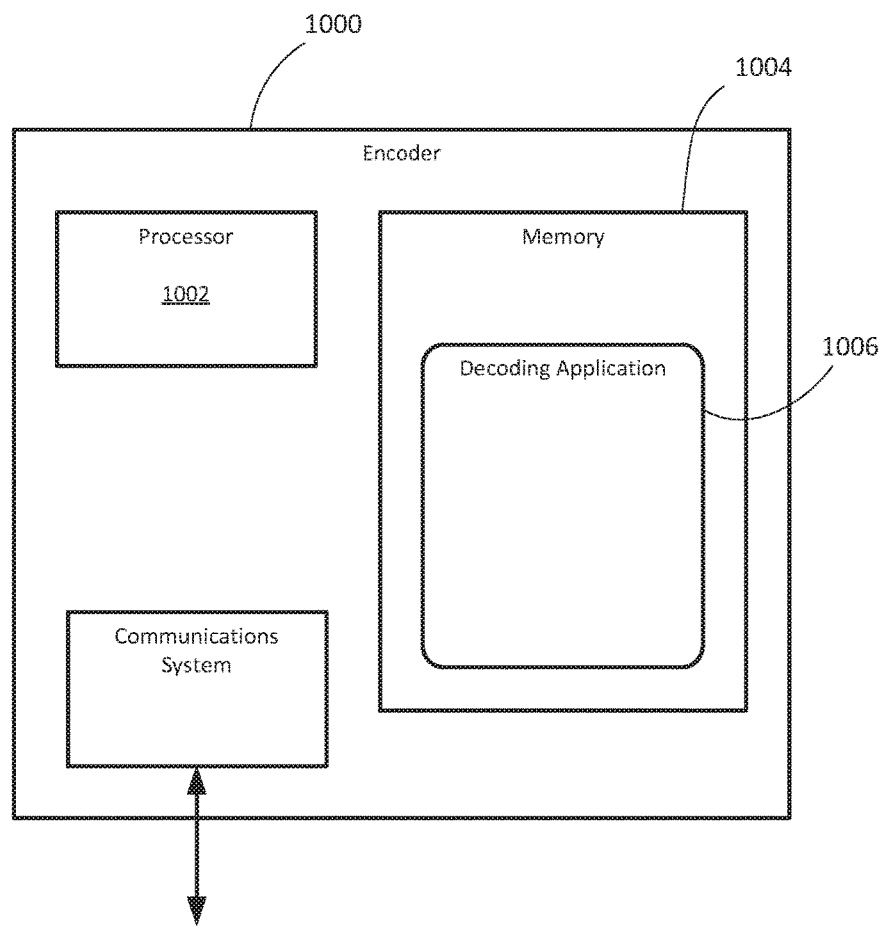
FIG. 13 shows a simplified block diagram of an example embodiment of a decoder.

Reference is now also made to FIG. 13, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform operations such as those described herein. The decoding application 1006 may include an entropy decoder configured to reconstruct residuals based on multi-level significance maps, as described herein. It will be understood that the decoding application 1006 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method for use in an encoder of an image to produce a bitstream of compressed image data, the encoder generating a transform unit from the image, the transform unit including transform coefficients, wherein the transform unit is represented by a significance map containing a significant-coefficient flag for each transform coefficient, and wherein the significance map is partitioned into a plurality of coefficient groups, each coefficient group having an associated significant-coefficient-group flag indicating whether its coefficient group contains at least one non-zero significant-coefficient flag, the method comprising:
    for one of the coefficient groups containing at least one non-zero significant-coefficient flag,
        determining, using rate-distortion optimized quantization, that said one of the coefficient groups is to be modified to contain all zero significant-coefficient flags, wherein determining includes determining a rate cost associated with encoding the significant-coefficient-group flags, the significant-coefficient flags, and remaining level information for the transform unit and a distortion based on modifying at least one transform coefficient in said one of the coefficient groups to be zero;
        based on that determination, setting all significant-coefficient flags in that coefficient group to zero and setting its significant-coefficient-group flag to zero; and
        entropy encoding the significant-coefficient-group flags and, for any coefficient groups having an associated significant-coefficient group flag that is non-zero, entropy encoding the significant-coefficient flags for those groups.

2. The method claimed in claim 1, further including, prior to determining that said one of the coefficient groups is to be modified to contain all zero significant-coefficient flags,
    applying a rate distortion optimization to the transform unit; and
    adjusting a level of one or more transform coefficients based on the rate distortion optimization to produce a rate-distortion optimized transform unit, wherein the significant-coefficients of the significance map represent the locations of non-zero coefficients in the rate-distortion optimized transform unit.

3. The method claimed in claim 1, further including first fixing the location of the last significant coefficient in a scan order in the transform unit, and excluding a last coefficient group containing the last significant coefficient from the rate-distortion optimized quantization.

4. The method claimed in claim 3, further including testing, in a reverse scan order, each of the coefficient groups other than the last coefficient group and a first coefficient group in the scan order.

5. The method claimed in claim 1, further including repeating the method, for the transform unit, using a different coefficient group size and selecting a coefficient group size that results in the most rate-distortion efficient bitstream.

6. The method claimed in claim 5, further including inserting information in the bitstream indicating the selected coefficient group size.

7. An encoder for encoding an image to produce a bitstream of compressed image data, the encoder generating a transform unit from the image, the transform unit including transform coefficients, wherein the transform unit is represented by a significance map containing a significant-coefficient flag for each transform coefficient, and wherein the significance map is partitioned into a plurality of coefficient groups, each coefficient group having an associated significant-coefficient-group flag indicating whether its coefficient group contains at least one non-zero significant-coefficient flag, the encoder comprising:
    a processor;
    a memory; and
    an encoding application stored in memory and containing instructions, which when executed, cause the processor to,
        for one of the coefficient groups containing at least one non-zero significant-coefficient flag,
            determine, using rate-distortion optimized quantization, that said one of the coefficient groups is to be modified to contain all zero significant-coefficient flags, wherein determining includes determining a rate cost associated with encoding the significant-coefficient-group flags, the significant-coefficient flags, and remaining level information for the transform unit and a distortion based on modifying at least one transform coefficient in said one of the coefficient groups to be zero;
            based on that determination, set all significant-coefficient flags in that coefficient group to zero and setting its significant-coefficient-group flag to zero; and
            entropy encode the significant-coefficient-group flags and, for any coefficient groups having an associated significant-coefficient group flag that is non-zero, entropy encode the significant-coefficient flags for those groups.

8. The encoder claimed in claim 7, wherein the instructions, when executed, further cause the processor to, prior to determining that said one of the coefficient groups is to be modified to contain all zero significant-coefficient flags, apply a rate distortion optimization to the transform unit; and adjust a level of one or more transform coefficients based on the rate distortion optimization to produce a rate-distortion optimized transform unit, wherein the significant-coefficients of the significance map represent the locations of non-zero coefficients in the rate-distortion optimized transform unit.

9. The encoder claimed in claim 7, wherein the instructions, when executed, further cause the processor to first fix the location of the last significant coefficient in a scan order in the transform unit, and exclude a last coefficient group containing the last significant coefficient from the rate-distortion optimized quantization.

10. The encoder claimed in claim 9, wherein the instructions, when executed, further cause the processor to test, in a reverse scan order, each of the coefficient groups other than the last coefficient group and a first coefficient group in the scan order.

11. The encoder claimed in claim 7, wherein the instructions, when executed, further cause the processor to repeat the method, for the transform unit, using a different coefficient group size and selecting a coefficient group size that results in the most rate-distortion efficient bitstream.

12. The encoder claimed in claim 11 wherein the instructions, when executed, further cause the processor to insert information in the bitstream indicating the selected coefficient group size.

13. A non-transitory processor-readable medium storing processor-executable instructions which, when executed, configures one or more processors to encode an image in an encoder to produce a bitstream of compressed image data, the encoder generating a transform unit from the image, the transform unit including transform coefficients, wherein the transform unit is represented by a significance map containing a significant-coefficient flag for each transform coefficient, and wherein the significance map is partitioned into a plurality of coefficient groups, each coefficient group having an associated significant-coefficient-group flag indicating whether its coefficient group contains at least one non-zero significant-coefficient flag, wherein the instructions comprise:

instructions to, for one of the coefficient groups containing at least one non-zero significant-coefficient flag,
determine, using rate-distortion optimized quantization, that said one of the coefficient groups is to be modified to contain all zero significant-coefficient flags, wherein determining includes determining a rate cost associated with encoding the significant-coefficient-group flags, the significant-coefficient flags, and remaining level information for the transform unit and a distortion based on modifying at least one transform coefficient in said one of the coefficient groups to be zero;
based on that determination, set all significant-coefficient flags in that coefficient group to zero and setting its significant-coefficient-group flag to zero; and
entropy encode the significant-coefficient-group flags and, for any coefficient groups having an associated significant-coefficient group flag that is non-zero, entropy encode the significant-coefficient flags for those groups.

14. The non-transitory processor-readable medium claimed in claim 13, wherein the instructions, when executed, further cause the one or more processors to, prior to determining that said one of the coefficient groups is to be modified to contain all zero significant-coefficient flags, apply a rate distortion optimization to the transform unit; and adjust a level of one or more transform coefficients based on the rate distortion optimization to produce a rate-distortion optimized transform unit, wherein the significant-coefficients of the significance map represent the locations of non-zero coefficients in the rate-distortion optimized transform unit.

15. The non-transitory processor-readable medium claimed in claim 13, wherein the instructions, when executed, further cause the one or more processors to first fix the location of the last significant coefficient in a scan order in the transform unit, and exclude a last coefficient group containing the last significant coefficient from the rate-distortion optimized quantization.

16. The non-transitory processor-readable medium claimed in claim 15, wherein the instructions, when executed, further cause the one or more processors to test, in a reverse scan order, each of the coefficient groups other than the last coefficient group and a first coefficient group in the scan order.

17. The non-transitory processor-readable medium claimed in claim 13, wherein the instructions, when executed, further cause the one or more processors to repeat the method, for the transform unit, using a different coefficient group size and selecting a coefficient group size that results in the most rate-distortion efficient bitstream.

18. The non-transitory processor-readable medium claimed in claim 17, wherein the instructions, when executed, further cause the one or more processors to insert information in the bitstream indicating the selected coefficient group size.

19. A method for use in an encoder of an image to produce a bitstream of compressed image data, the encoder generating a transform unit from the image, the transform unit including transform coefficients, wherein the transform unit is represented by a significance map containing a significant-coefficient flag for each transform coefficient, and wherein the significance map is partitioned into a plurality of coefficient groups, each coefficient group having an associated significant-coefficient-group flag indicating whether its coefficient group contains at least one non-zero significant-coefficient flag, the method comprising:

for one of the coefficient groups containing at least one non-zero significant-coefficient flag,
determining, using rate-distortion optimized quantization, that said one of the coefficient groups is to be modified to contain all zero significant-coefficient flags, wherein the determining includes first fixing the location of the last significant coefficient in a scan order in the transform unit, and excluding a last coefficient group containing the last significant coefficient from the rate-distortion optimized quantization and wherein the determining further includes testing, in a reverse scan order, each of the coefficient groups other than the last coefficient group and a first coefficient group in the scan order;
based on that determination, setting all significant-coefficient flags in that coefficient group to zero and setting its significant-coefficient-group flag to zero; and
entropy encoding the significant-coefficient-group flags and, for any coefficient groups having an associated significant-coefficient group flag that is non-zero, entropy encoding the significant-coefficient flags for those groups.

20. An encoder for encoding an image to produce a bitstream of compressed image data, the encoder generating a transform unit from the image, the transform unit including transform coefficients, wherein the transform unit is represented by a significance map containing a significant-coefficient flag for each transform coefficient, and wherein the significance map is partitioned into a plurality of coefficient groups, each coefficient group having an associated significant-coefficient-group flag indicating whether its coefficient group contains at least one non-zero significant-coefficient flag, the encoder comprising:

a processor;

a memory; and an encoding application stored in memory and containing instructions, which when executed, cause the processor to, for one of the coefficient groups containing at least one non-zero significant-coefficient flag, determine, using rate-distortion optimized quantization, that said one of the coefficient groups is to be modified to contain all zero significant-coefficient flags, wherein the determining includes first fixing the location of the last significant coefficient in a scan order in the transform unit, and excluding a last coefficient group containing the last significant coefficient from the rate-distortion optimized quantization and wherein the determining further includes testing, in a reverse scan order, each of the coefficient groups other than the last coefficient group and a first coefficient group in the scan order;

based on that determination, set all significant-coefficient flags in that coefficient group to zero and setting its significant-coefficient-group flag to zero; and entropy encode the significant-coefficient-group flags and, for any coefficient groups having an associated significant-coefficient group flag that is non-zero, entropy encode the significant-coefficient flags for those groups.

* * * * *

UNITED STATES PATENT AND TRADEMARK OFFICE
CERTIFICATE OF CORRECTION

PATENT NO. : 10,205,945 B2
APPLICATION NO. : 15/884535
DATED : February 12, 2019
INVENTOR(S) : Nguyen et al.

Page 1 of 1

It is certified that error appears in the above-identified patent and that said Letters Patent is hereby corrected as shown below:

In the Specification

In Column 15, Line 9, delete "1, N" and insert -- 1, ..., N --, therefor.

In Column 15, Line 21, delete "1, N" and insert -- 1, ..., N --, therefor.

In Column 18, Line 3, delete "[yGC]" and insert -- [yCG] --, therefor.

In Column 18, Lines 35-36, delete "(log 2TrafoSize>3))." and insert -- (log2TrafoSize>3)). --, therefor.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*